(12) United States Patent
Muratore et al.

(10) Patent No.: US 7,756,514 B2
(45) Date of Patent: Jul. 13, 2010

(54) METHOD AND SYSTEM FOR CALL FORWARDING BETWEEN A WIRELESS SWITCHING APPARATUS AND A FIXED TELEPHONY NETWORK USING A VIRTUAL NUMBER

(75) Inventors: Giuliano Muratore, Rome (IT); Giancarlo Sarti, Rome (IT); Maurizio Marcelli, Rome (IT)

(73) Assignee: Telecom Italia S.p.A., Milan (IT)

( * ) Notice: Subject to any disclaimer, the term of this patent is extended or adjusted under 35 U.S.C. 154(b) by 420 days.

(21) Appl. No.: 10/580,047

(22) PCT Filed: Nov. 20, 2003

(86) PCT No.: PCT/EP03/50859

§ 371 (c)(1),
(2), (4) Date: May 19, 2006

(87) PCT Pub. No.: WO2005/055577

PCT Pub. Date: Jun. 16, 2005

(65) Prior Publication Data

US 2007/0149182 A1 Jun. 28, 2007

(51) Int. Cl.
H04M 3/42 (2006.01)
(52) U.S. Cl. .................. 455/417; 455/445; 379/211.03
(58) Field of Classification Search ................. 455/417, 455/418, 414.1, 445; 379/233, 201.1, 211.02, 379/211.03
See application file for complete search history.

(56) References Cited

U.S. PATENT DOCUMENTS 5,544,227 A * 8/1996 Blust et al. ............... 455/426.1
5,579,375 A * 11/1996 Ginter ........................ 455/417
5,600,704 A * 2/1997 Ahlberg et al. .............. 455/445
5,839,067 A 11/1998 Jonsson (Continued)

FOREIGN PATENT DOCUMENTS

| EP | 1 198 113 A1 | 4/2002 |
|---|---|---|
| GB | 2 290 675 A | 1/1996 |
| JP | 10-257132 A | 9/1998 |

OTHER PUBLICATIONS

English translation of Japanese Patent Office Action from corresponding Japanese Patent Application 511201-2005, mailed Jan. 7, 2009.

*Primary Examiner*—Nick Corsaro
*Assistant Examiner*—Vladimir Magloire
(74) *Attorney, Agent, or Firm*—Finnegan, Henderson, Farabow, Garrett & Dunner, L.L.P.

(57) ABSTRACT

A method and a related system for forwarding a telephone call from a caller intended to be directed to a first, fixed, telephony number to a second, mobile, telephone number in order to render an intended responder associated with the mobile telephony number reachable at a mobile phone instead that at a fixed telephone. The method includes having the caller place a call to a virtual mobile telephony number associated with the fixed telephony number; conditioned to the fact that call forwarding from the fixed telephony number to the mobile telephony number is enabled, routing the call to the mobile telephony number; and, if the responder accepts, terminating the call from the caller at the mobile telephony number of the responder instead of at the fixed telephony number, so as to establish a direct telephone call between the caller and the responder. This direct telephone call is viewed by the caller as a call to a mobile telephony number, and, in particular, the caller sustains the cost of the call.

21 Claims, 6 Drawing Sheets

U.S. PATENT DOCUMENTS

| | | |
|---|---|---|
| 5,842,112 A | 11/1998 | Fuller et al. |
| 5,848,140 A | 12/1998 | Foladare et al. |
| 5,995,843 A * | 11/1999 | Sjodin et al. ................ 455/462 |
| 6,141,545 A | 10/2000 | Begeja et al. |
| 6,411,802 B1 * | 6/2002 | Cardina et al. .............. 455/424 |
| 2002/0004385 A1 | 1/2002 | Yamamoto et al. |
| 2002/0019242 A1 | 2/2002 | Kramer |
| 2002/0132613 A1 * | 9/2002 | Leung et al. ................. 455/414 |
| 2002/0132638 A1 | 9/2002 | Plahte et al. |
| 2004/0018833 A1 * | 1/2004 | Praestgaard .............. 455/422.1 |

* cited by examiner

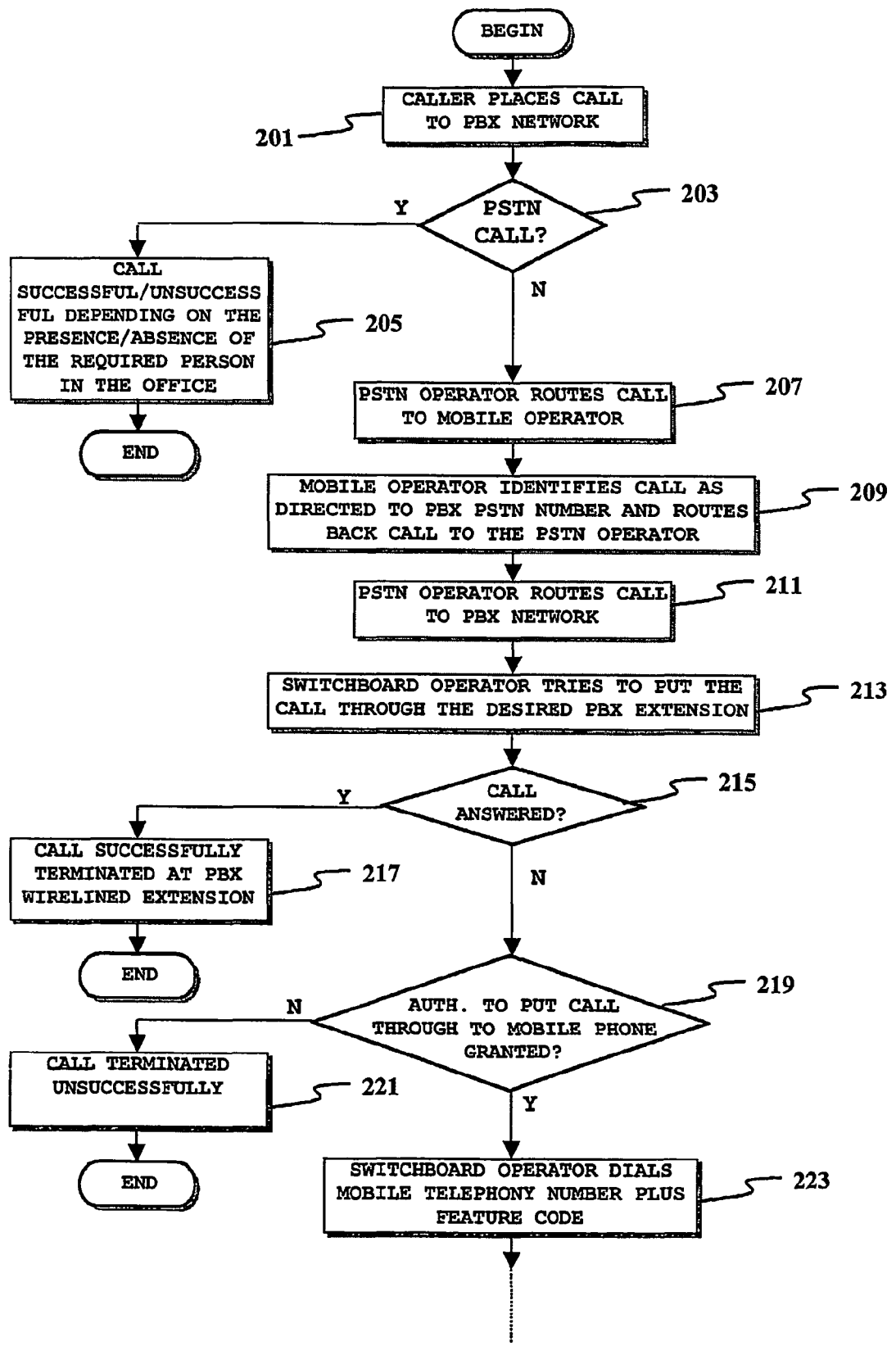
FIG. 2 (1st of 2)

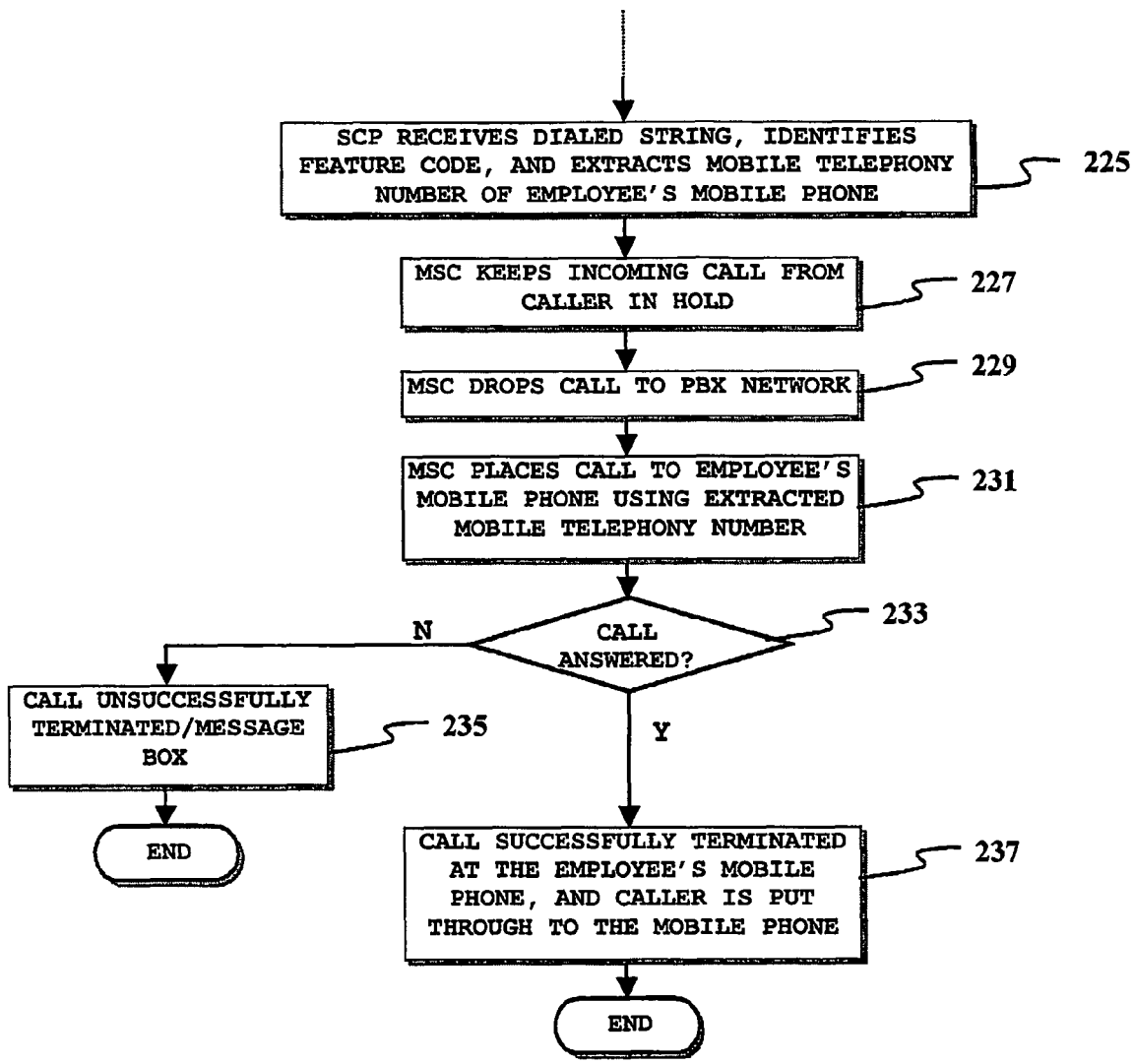
FIG. 2 (2nd of 2)

METHOD AND SYSTEM FOR CALL FORWARDING BETWEEN A WIRELESS SWITCHING APPARATUS AND A FIXED TELEPHONY NETWORK USING A VIRTUAL NUMBER

CROSS REFERENCE TO RELATED APPLICATION

This application is a national phase application based on PCT/EP2003/050859, filed Nov. 20, 2003, the content of which is incorporated herein by reference.

BACKGROUND OF THE INVENTION

1. Field of the Invention

The present invention generally relates to the field of telecommunications, particularly telephone communications. More specifically, the invention concerns a method, and a related system implementing the method, for forwarding telephone calls towards a mobile (cellular) phone.

2. Description of the Related Art

Telephone communications have long been and still are an extremely important, not to say essential inter-personal communication means, in both private life and business.

The importance of enabling a person, such as an employee, communicating by phone has led almost all of the business organizations, operating in the most diverse fields, to set up office telephony infrastructures comprising Private Branch Exchange (PBX) networks including from a few to a very large number of extensions, thereby possibly each employee can have a personal telephone on his/her desk, and can thus be reached by external calls.

However, in recent years the mobility of the workforce has increased significantly, and in order to enable people doing at best their job even when they are out of the office, business organizations normally provide at least a part of their employees with mobile phones.

In order to let an employee be reached by a telephone call directed to him/her and received at the employer's PBX, the most trivial solution is that an operator at the PBX switchboard, receiving and answering the external call, firstly forwards the call to the correct PBX extension and, in case of no response, informs of this the calling person and provides thereto the employee's mobile phone number, thereby the calling person can directly try to call the desired person over the mobile phone.

Clearly, this way of doing is unsatisfactory under several respects. Firstly, it implies that the mobile phone number of the employee be revealed, which is something highly undesirable, for reasons of privacy. Secondly, the calling person has to place two calls, which may result annoying, at least for reasons of costs.

A better solution is to forward the incoming telephone call to the employee's mobile phone.

Forwarding of telephone calls (shortly, call forwarding) is a feature commonly made available by almost all of the telephone companies, and even by specialized PBXS. When enabled, this feature allows re-directing calls originally directed to a telephone number towards another telephone number, specified by the user.

Call forwarding is probably better known in wire-lined, i.e. fixed telephone networks, but several solutions have been proposed that exploit call forwarding for enabling employees that are out of the office to be reached on their mobile phones.

An exemplary solution is provided in the U.S. Pat. No. 5,839,067, whose basic concern is however to allow a company/organization controlling all outgoing calls from its mobile telephones, so as to avoid overbilling due to more or less fraudulent use thereof for private purposes. In that document, a corporate/organization communications system is described including a mobility server service node connected to the company/organization's PABX, managing calls to and from corporate/organization's mobile phones. When a PABX external subscriber makes a call to an employee who is out of the office, the PABX, after having established that the employee is out, routes the call to the mobility server, which parks the call and notifies the called employee by making an outgoing call to the employee's mobile phone. The called employee, once notified, makes an outgoing call to the mobility server using the home PABX number and, when asked for the destination of the call, he/she dials a predefined code, thereby the PABX interconnects the call with the parked call.

Another exemplary solution of call forwarding is provided in the United States patent application US 2002/0019242 A1, describing a method and apparatus for communicating via virtual office telephone extensions. A wireless connect unit, in communication with an enterprise's PBX network, serves as a gateway between the PBX and remote communication devices including wireless devices, associated with a virtual extension telephone number. The remote wireless device can be used as a standard PBX office telephone for both inbound and outbound calls. When the system receives an incoming call, it can route the call to a remote wireless device associated with a virtual extension.

Still another example of call forwarding solution is provided in the United States patent application US 2002/0132638 A1, that describes a mobile branch exchange (MBX) allowing a mobile phone user to exploit the functionality of a PBX as if he/she were using a PBX-connected wire line phone in an office setting. An incoming call from a remote telephone arriving at the PBX is routed to the office telephone associated with the telephone number dialed. The MBX is notified of the call, and two processes are initiated: first, the MBX sets up a phantom call between a virtual terminal associated with a phantom PBX number and the mobile phone, via the GSM network; second, a data path is established between the MBX and the mobile phone, whereby the mobile phone user can apprise of who the caller is. If the mobile phone user decides to answer, the virtual terminal holds the phantom call and places a new call to the office telephone, and the phantom call and the new call are conferenced together. Then, the new call is answered and placed in hold, the incoming call is answered, and the new call is transferred, whereby the end effect is to merge the phantom call and the incoming call, and remove the office telephone from the call. In this way, the MBX causes the PBX to automatically connect a remote caller, who dialed an office telephone number, to a mobile telephone user, without the remote caller even knowing that the mobile telephone user is not actually answering the call from his/her office telephone.

Forwarding of telephone calls received at a wire-line telephone line associated with a PBX is also at the base of U.S. Pat. No. 6,141,545, which however describes a method and a system by means of which a subscriber to a remote call forwarding feature on the wire-lined telephone can enable the call forwarding remotely, by dialing a feature code from his/her cellular phone.

The Applicant observes that the phone call forwarding methods and systems briefly discussed in the foregoing, although satisfactory under many respects, share however a common drawback that, according to the Applicant's perception, may significantly limit their widespread diffusion.

Exception made for very special cases such as toll-free numbers or, at least partially, in international roaming contexts, when a caller makes a telephone call to another person the cost of the call is normally sustained by the caller, not by the called. In the call forwarding methods and systems known in the art, instead, when an external telephone call arriving at the PBX, or at an extension thereof, is forwarded to the mobile phone of the employee, the cost of the call from the PBX to the employee's mobile phone is sustained by the employer, the calling person only sustaining the cost of a normal, PSTN call, that is a call to a fixed, non-mobile telephone number. This causes an extra-cost for the employer's organization. Many enterprises/companies might for this reason decide not to implement this call forwarding capability, thus greatly limiting the possibilities of intercommunications for their employees.

SUMMARY OF THE INVENTION

In view of the state of the art outlined in the foregoing, it has been an object of the present invention to provide a method and a system for forwarding telephone calls that are not affected by the above-mentioned drawback.

The Applicant has found that the problem of avoiding that a company/enterprise is billed for the telephone calls forwarded to the mobile phones of its employees can be overcome if a mobile telephony operator associates a mobile telephony number with, e.g., the company's fixed-telephony PBX network, and the callers wishing to have their calls forwarded, if necessary, to the company employees' mobile phone are asked to place calls to the company PBX network dialing said mobile telephony number, instead of the fixed telephony number of the PBX network. Thus, in case the desired employee does not answer the call at his/her PBX wire-lined extension telephone, the call may be forwarded to the employee's mobile phone, but also in this case the overall cost of the call is sustained by the caller, who from the beginning is aware of the fact that he/she will be paying for a mobile telephony call.

According to a first aspect of the present invention, there is provided a method of forwarding telephone calls as set forth in appended independent method claim 1.

Shortly, the method comprises:

having a caller placing a call to a virtual mobile telephony number associated with a first, fixed, telephony number;

receiving the call from the caller at a switching apparatus of a mobile telephony network;

conditioned to the fact that a call forwarding from the first telephony number to a second, mobile, telephony number is enabled, routing the call from the switching apparatus to the second telephony number; and provided that the responder accepts, terminating the call from the caller at the second telephony number instead of at the first telephony number, so as to establish a direct telephone call between the caller and the responder.

The direct telephone call between the caller and the responder is viewed by the caller as a call to a mobile telephony number, and, in particular, the caller sustains the cost of the call.

For the purposes of the present invention, by terminating a call there is intended the act of putting a caller in connection with a responder, such an act being typically associated with the start of the call billing process.

In an embodiment of the present invention, the method further comprises firstly routing the incoming call to the first telephony number upon receiving the call from the caller to the virtual mobile telephony number at the switching apparatus.

The call forwarding may be enabled at an apparatus associated with the first telephony number. Conditioned to the fact that the call forwarding is not enabled and that the incoming call is answered at the first telephony number, the call may be terminated thereat and a direct telephone call be consequently established between the caller and the first telephony number. This call is viewed by the caller as a mobile telephony call.

In case the call is not answered at the first telephony number, the second telephony number is determined, and said call forwarding is enabled.

In an embodiment of the present invention, after the enabling of the call forwarding, a call section from the switching apparatus to the first telephony number is dropped, while the call from the caller is kept in hold at said switching apparatus.

In particular, the first telephony number may correspond to a PBX network having a plurality of extensions.

The first telephony number may thus include a number of a PBX network switchboard. In this case, the call from the caller may be received at a PBX switchboard associated with the first telephony number, be forwarded to an intended PBX network extension and, in case the call is not answered, the second telephony number may be provided to a switching apparatus control controlling the switching apparatus.

The first telephony number may comprise at least one PBX Direct Inward Dial (DID) number corresponding to one of the extensions of the PBX network. The virtual mobile telephony number associated with the first mobile telephony number may comprise at least one virtual mobile telephony number associated with said one extension of the PBX network.

In a preferred embodiment of the present invention, the virtual mobile telephony number associated with the first mobile telephony number is a combination of the first telephony number and an identifying code, particularly a prefix code.

According to a second aspect of the present invention, a method is provided as set forth in claim 13, for operating a switching apparatus of a mobile telephony network in order to forward a telephone call from a caller intended to be directed to a first, fixed, telephony number towards a second, mobile, telephony number, so as to render an intended responder associated with the second telephony number reachable at a mobile phone instead that at a fixed telephone.

In brief, the method comprises:

associating a virtual mobile telephony number with the first telephony number;

receiving a call placed to the virtual mobile telephony number at the mobile telephony network switching apparatus;

conditioned to the fact that a call forwarding from the first telephony number to the second telephony number is enabled, routing the call from the switching center to the second telephony number; and provided that the responder accepts, terminating the call from the caller at the second telephony number instead of at the first telephony number, so as to establish a direct telephone call between the caller and the responder.

As before, this direct telephone call is viewed by the caller as a call to a mobile telephony number and, in particular, the caller sustains the cost of the call.

The method may further comprise:

upon receiving, at the switching apparatus, the call from the caller to the virtual mobile telephony number, firstly routing the call from the caller to the first telephony number, and, if the call from the caller is answered at the first telephony number, terminating the call thereat so as to establish a direct telephone call between the caller and the first telephony number.

Also this direct telephone call is viewed by the caller as a mobile telephony call.

The method may further comprise receiving information apt to determine the second telephony number from an apparatus associated with said first telephony number, and causing the call from the caller to be routed thereto.

After the information apt to determine the second telephony number has been received, a call section from the switching center to the first telephony number is dropped, while the call from the caller is kept in hold.

According to a third aspect of the present invention, there is provided a system as set forth in claim 17, for forwarding a telephone call from a caller intended to be directed to a first, fixed, telephony number towards a second, mobile, telephony number in order to render an intended responder associated with the mobile telephony number reachable at a mobile phone instead that at a fixed telephone.

The system comprises:

a database associating a virtual mobile telephony number with the first telephony number; and a call transport layer of a mobile telephony network adapted to:

routing a call to the second telephony number in case a call forwarding from the first telephony number to the second telephony number is enabled; and provided that responder accepts, terminating the call from the caller at the second telephony number instead of at the first telephony number, so as to establish a direct telephone call between the caller and the responder.

This direct telephone call is viewed by the caller as a call to a mobile telephony number and, in particular, the caller sustain the cost of the call.

In particular, the first telephony number is a number of a PBX network having a plurality of extensions.

In particular, said first telephony number includes a number of a PBX network switchboard, and it may also comprises at least one PBX Direct Inward Dial (DID) number corresponding to one of the extensions of the PBX network. Said virtual mobile telephony number associated with the first mobile telephony number may comprise at least one virtual mobile telephony number associated with said one extension of the PBX network.

Preferably, said virtual mobile telephony number associated with the first mobile telephony number is a combination of the first telephony number and an identifying code, particularly a prefix code.

BRIEF DESCRIPTION OF THE DRAWINGS

The features and advantages of the present invention will be made apparent by the following detailed description of some exemplary embodiments thereof, provided merely by way of non-limitative examples, description that will be conducted making reference to the attached drawings, wherein:

FIG. 2 is a schematic flowchart providing a graphic view of a call forwarding method according to an embodiment of the present invention;

DETAILED DESCRIPTION OF THE INVENTION

Figure 1:
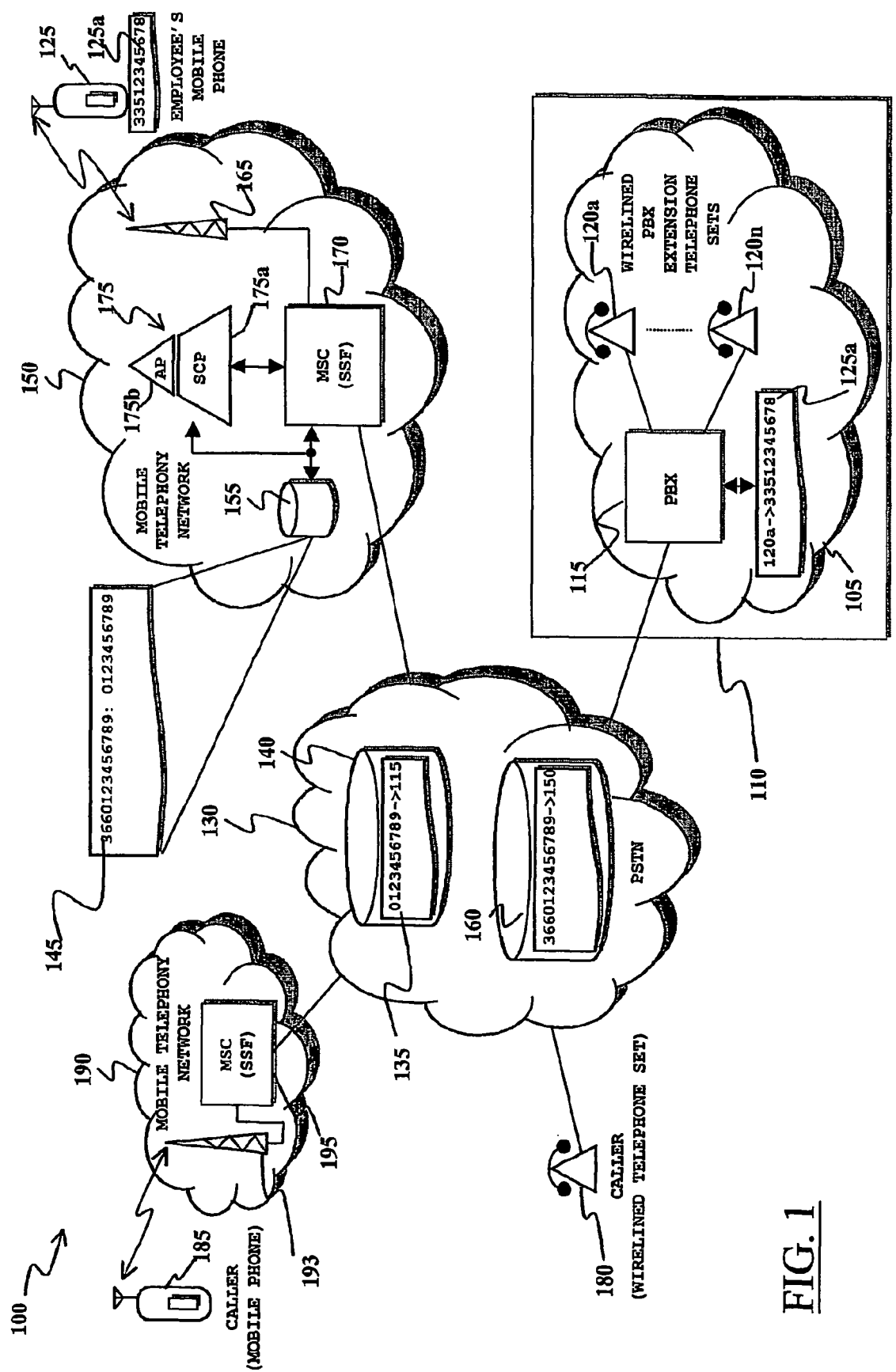
FIG. 1 shows pictorially a telephone communications system according to an embodiment of the present invention.

With reference to the drawings, in FIG. 1 a telephone communications system according to an exemplary embodiment of the present invention is pictorially shown. The telephone communications system, globally identified as 100, comprises a PBX telephone network 105 of a generic business entity 110, such as an enterprise/company, a public administration, or even a small-scale office environment. The PBX telephone network 105 conventionally includes a PBX switchboard 115, either human-operated or automatic (PABX), or a mix thereof, supporting a plurality of telephone extensions; each one of the exploited telephone extension is associated with a respective wire-lined telephone set 120a, . . ., 120n within the premises of the business entity 110. Alternatively, or additionally, all or at least some of the wire-lined telephone sets associated with PBX telephone extensions are or include cordless telephones, which allow the employees of the business entity 110 a relative mobility within the premises thereof.

The business entity 110 is assumed to include in its workforce mobile people, e.g. people that spend a significant part of their working time outside the premises of the business entity 110, and cannot therefore be reachable by means of the wire-lined sets 120a, . . ., 120n only. These mobile employees are provided with mobile telephones, such as the mobile telephone 125 shown in the drawing, with an associated mobile telephony number 125a, which the mobile employees exploit for their activity on behalf of the business entity 110 (or, possibly, also for private affairs) when they are not within the premises thereof, or when they are not close to their wire-lined telephone set, and cannot therefore be reached through one of the telephone sets 120a, . . ., 120n. The employee's mobile phone 125 may be any one of the known mobile phones adapted to operate in conventional mobile telephony networks, for example General System for Mobile communications (GSM) cellular phone networks or known extension thereof such as General Packet Radio Service (GPRS) networks (which actually is a sub-network of the GSM network) or Universal Mobile Telecommunications System (UMTS) networks (a wide-band third-generation cellular communication system), or even satellite-based mobile communication networks. In this way, the mobile workforce of the business entity 110 is enabled performing the intended duties and, at the same time, interpersonal communications are allowed despite the fact that the employees are delocalized.

The PBX network 105 of the business entity 110 is connected by a wire-line to a Public Switched Telephony Network (PSTN) 130.

Normally, the PBX network 105 is assigned one or more PSTN telephone numbers (i.e., wire-line, non-mobile telephone numbers) by the PSTN company to which the business entity 110 is a subscriber.

Differently from conventional PBX networks, according to the invention embodiment described herein the PBX network 115 is a subscriber of one mobile telephony network operator 150, among the mobile telephony network operators that provides mobile telephony services in the territory of the business entity 110, and, in addition to a conventional, PSTN telephone number 135 (depicted as stored in a PSTN subscriber number database 140), has been assigned by the operator of the mobile telephony network 150 a mobile telephony number, which is a PBX virtual mobile telephony number 145, different from but associated with the PBX PSTN telephone number 135. The mobile telephony network 150 is for example a GSM network, a GPRS network or a UMTS network.

Accordingly, telephone calls can be placed to the business entity 110 either by dialing its PSTN number 135, or dialing the respective PBX mobile telephony number 140 (e.g., 366012345678) associated therewith. Preferably, this PBX virtual mobile telephony number 145 (which is schematically depicted as stored in a mobile telephony network database 155, wherein the PBX mobile telephony number 140 is associated with the PSTN telephone number 135), is a number including the PSTN telephone number 135 (in the example, 012345678) of the PBX network 105, with a suitable prefix (in the example herein considered, the prefix "366"; a different prefixing scheme will be described later on) that enables identifying the proper mobile telephony network operator 150 to which the PBX network 105 is subscriber; for example, such a prefix is stored in a database 160 held by the PSTN 130 and a correspondence is established between the prefixes (or between the prefix plus the PSTN telephone numbers) and the respective mobile telephony network operators. In this way, the PBX mobile telephony number 140 is better memorized by the users.

As known in the art, the mobile telephony network 150 comprises a plurality of base stations, such as the base station 165, and groups of base stations are connected (either directly or by base station clusters connected to respective base station controllers) to a Mobile Switching Center (MSC), such as the MSCs 170, acting as a telephone call transport layer (a layer in the network architecture that implements the Service Switching Function—SSF). The MSCs are connected to a PSTN, such as the PSTN 130 to which the MSC 170 may be coupled. The MSC 170 is coupled to a Service Control Point (SCP) 175, typically through a secure connection such as an SS7 signaling network (in particular, the SCP 175 and the MSC 170 may be placed at a same physical location, thereby they are connected to each other directly, the connection security being in this case ensured). The SCP 175 acts as a network control layer for the call transport layer implemented by the MSC 170. In the drawing, the SCP 175 is depicted as comprised of an SCP control layer 175a, on top of which an APplication (AP) layer 175b is provided which is assumed to implement a service logic adapted to actuating the call forwarding method according to the herein described embodiment of the invention. The pictorial representation of the SCP 175 makes use of a symbolism adopted to identify an intelligent network, such as an Open System Architecture (OSA) UMTS intelligent network, in which, differently from a classical network, the part of the network apparatuses where the service AP layer resides may be implemented in a distributed manner, even outside the context of the network operator 150.

Also schematically shown in FIG. 1 are a wire-lined telephone set 180, connected to the PSTN 130, and a mobile phone 185, registered in a mobile telephony network 190 that can be operated by the same operator as the mobile telephony network 150, or by a different mobile telephony operator. Also the mobile telephony network 190 has base stations, such as the base station 193 shown in the drawing, connected to MSCs, such as the MSC 195, which are connected to the PSTN 130 or directly to the MSCs of the other mobile telephony networks, such as the MSC 170 of the mobile telephony network 150.

The wire-lined telephone set 180 or the mobile phone 185 are supposed to be the apparatuses from which a person (hereinafter, the caller) wishing to communicate with one of the business entity's employees, places a telephone call to the business entity 110. The caller can place the call by dialing either the PSTN number 135 or the respective PBX mobile telephony number 140, at choice; as will be explained in the following, the choice of the type of call conditions the possibility of having the call forwarded to the mobile phone 125 of the desired person.

Figure 3A:
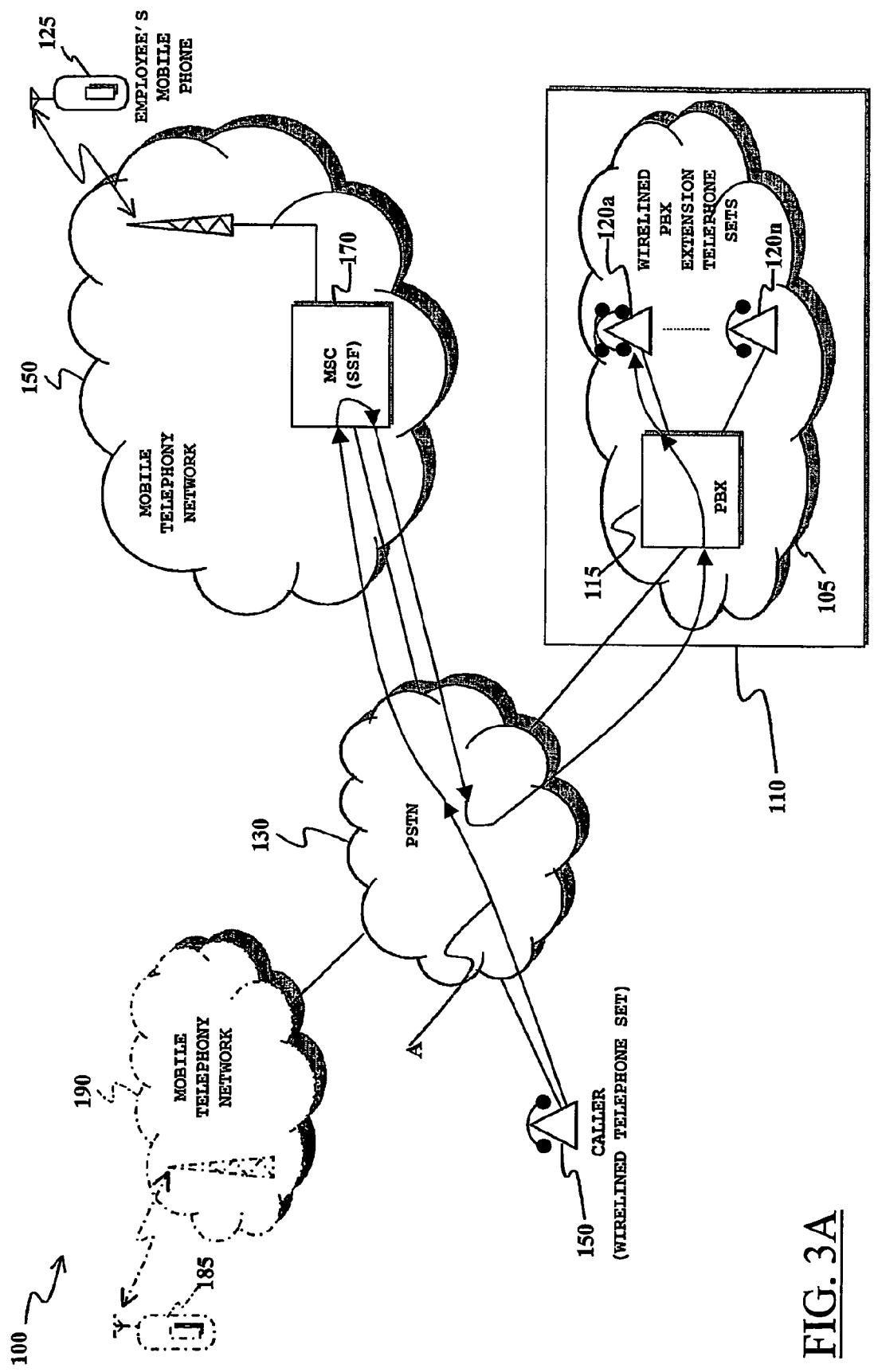
FIGS. 3A to 3C provide simplified views of the telephone communications system of FIG. 1 during the main steps of the call forwarding method of FIG. 2.
Figure 3B:
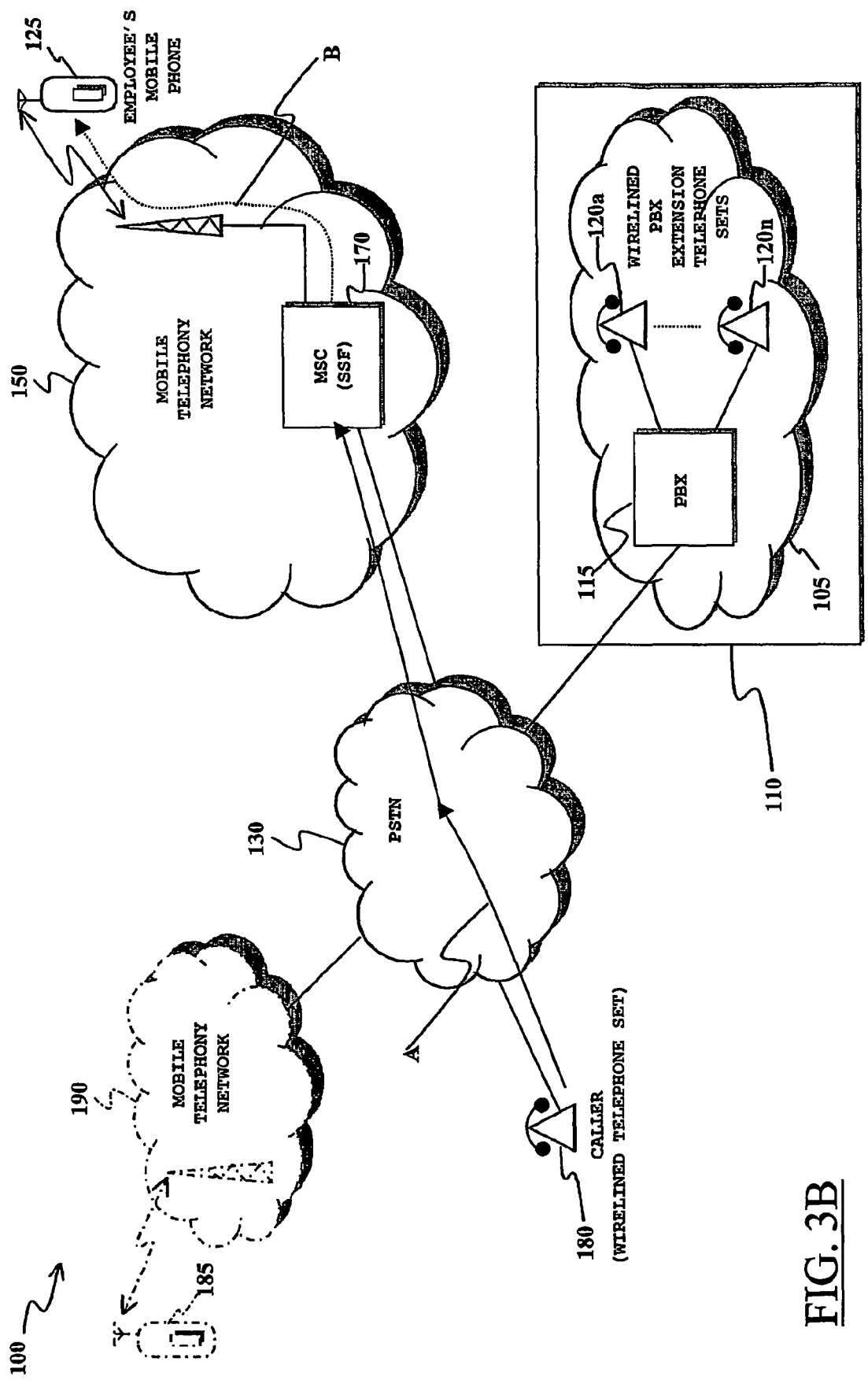

In the following, an example of a call forwarding carried out following a method according to an embodiment of the present invention will be described, with the help of the schematic flowchart of FIG. 2, and of the simplified system sketches of FIGS. 3A to 3C.

Let it first be assumed that the caller places a telephone call (block 201) to the PBX switchboard 115 by dialing the PSTN number 135 (012345678), and asks the switchboard operator to be put through to one of the employees, for example the one having associated therewith the PBX extension corresponding to the wire-lined telephone 120a (alternatively, provided that the PBX network 105 supports Direct Inward Dial—DID—the caller might try to contact the desired employee directly, dialing the PSTN number 135 plus the extension code). For simplicity, it is assumed that the caller places the call from the wire-lined telephone set 180, in which case the first call is a fixed-to-fixed telephony number call, and is billed to the caller; nothing actually changes if the call were placed from the mobile phone 185, apart from the fact that in the former case, the telephone call is already in the context of the PSTN 130, while in the latter case the operator of the mobile telephony network 190 routes the telephone call to the PSTN 130 (alternatively, the mobile telephony network 190 directly routes the telephone call from the mobile phone 185 to the mobile telephony network 150, or, in case the two mobile telephony networks coincide, the telephone call needs not be routed to a different network). In this case the call would be a mobile-to-fixed telephony number call, and also in this case it would be billed to the caller.

The PSTN operator, after having detected that the telephone call is a fixed-to-fixed telephony number call (decision block 203, exit branch Y), routes the telephone call to the PBX switchboard in a totally conventional way. The switchboard operator tries to put the incoming call through to the desired extension 120a; if the desired employee is in the office, he/she will answer the call from the switchboard 115, and, if he/she agrees, he/she will be connected to the caller. In case the desired employee is out of the office, after a certain number of rings the switchboard operator normally gives up, and informs the caller that the desired person is not available at that moment (all this operations are summarized in the flowchart as a single block 205); the caller has nothing to do but retrying at a later time, unless he/she knows the mobile phone number of the desired person, in which case the caller may place another, second call to the employee's mobile phone; this second call, if placed is a fixed-to-mobile telephony number call or, in case it is placed from the mobile phone 185, it is a mobile-to-mobile telephony number call, but in both cases the two calls are billed to the caller.

Let instead be assumed that the caller calls the PBX switchboard 115 by dialing the PBX virtual mobile telephony number 145 (in the example, 3660123456789). The PSTN operator, after having detected that the number dialed is a mobile telephony number (decision block 203, exit branch N) and having identified which is the mobile telephony network operator, routes the call from the caller (identified as call A in FIG. 3A) to the proper mobile telephony network operator 150 (block 207).

The mobile telephony network 150 operator receives the call A at the MSC 170 and, looking in the database 150, identifies the call as a call to the PBX network 105; in particular, in the database 155 there is an association between the virtual mobile telephony number 145 of the PBX network 105 and the PSTN telephone number 135 of the PBX network 105. Under the control of the SCP 175, the call is routed back to the PSTN operator as a call to the PBX PSTN number 135, in the example, 012345678 (block 209). The PSTN operator routes the call to the PBX network switchboard 115 (block 211).

As before, when the switchboard operator answers the incoming call, the caller asks him/her to be put through to one of the employees, for example the one having associated therewith the PBX extension corresponding to the wire-lined telephone 120a. Preferably, a suitable information is provided to the switchboard operator enabling him/her to identify the incoming call as one placed to the PBX mobile telephony number 145 (thus, a call that is potentially subject to being passed through to the employee's mobile phone). The call from the caller is thus at least temporarily terminated at the PBX network switchboard 115.

The switchboard operator tries to put the incoming call through to the desired extension 120a (block 213), exactly in the same way as in the previously described way. If the desired employee is in the office, he/she answers the call from the switchboard 115, and, if he/she agrees to have the call put through to him/her (decision block 215, exit branch Y), he/she is connected to the caller, and the call is terminated successfully (block 217). On the contrary, in case the desired employee is out of the office and does not answer the call from the switchboard 115, after a certain number of rings the switchboard operator gives up, decreeing that the desired employee is not in the office; alternatively, the switchboard operator may have been informed in advance that the called employee is out of the office.

Provided that he/she has been authorized to do so (decision block 219, exit branch Y), the switchboard operator tries to put the call through to the employee's mobile phone 125; however, in case the authorization to put calls through (possibly, only calls from that caller, or from a class of callers including caller) has not been granted to the switchboard operator, the switchboard operator informs the caller that the desired employee is absent, and the call is terminated unsuccessfully (block 221). It is understood that, in this way, the switchboard operator performs a filtering action similar, but in addition, to the filtering action he/she performs when he/she is asked to put incoming calls through to wire-lined PBX extensions.

In order to put the call through to the employee's mobile phone 125, the switchboard operator firstly finds the mobile telephony number of the desired employee's mobile phone, for example searching in an internal phone directory. Then, the switchboard operator dials the mobile telephony number of the desired employee, in association with a prescribed feature code, for example a DTMF code (block 223); for example, the DTMF code may precede or follow the mobile telephony number of the desired employee.

The number dialed by the switchboard operator is received at the MSC 170 of the mobile telephony network 150. When the MSC 170 of the mobile telephony network 150 receives the dialed number with the prescribed feature code, the SCP 175 (specifically, the service application logic 175b) identifies the feature code, extracts from the dialed sequence the mobile telephony number of the employee's mobile phone 125 (block 225), and causes the MSC 170 to:

a) keep the incoming call A from the caller (block 227) in hold;

b) drop the call section from the MSC 170 to the switchboard of the PBX network 105 (block 229), and c) route the incoming call (as schematized by a call section B in FIG. 3B) to the employee's mobile phone 125, using the extracted mobile telephony number (block 231).

Provided that the employee's mobile phone 125 is on and registered in the mobile telephony network 150 (or in any mobile telephony network having a roaming agreement with the mobile telephony network 150), the mobile phone 125 will ring. Preferably, suitable indications will be sent by the SCP 175 to the mobile phone 125 adapted to enable the user of the mobile phone 125 understand that the incoming call is a forwarded call initially directed to the PBX network 105; also, information adapted to allow the user of the mobile phone 125 identifying the caller are provided, for example the Calling Line Identity (CLI) of the caller, e.g. the telephone number of the caller; in this way, the employee is enabled deciding whether or not to respond to the call.

Preferably, while the caller waits to be put through to the employee's mobile phone 125, courtesy messages are sent to the caller.

If the employee decides not to answer the incoming call at his/her mobile phone 125 (decision block 233, exit branch N), the call section B is not completed, and the call A from the caller is unsuccessfully terminated (block 235); possibly, the caller is deviated to a message box that the mobile telephony network 150 operator has set up in association with the mobile telephony number 125a; in this case, the courtesy message for the caller should preferably not provide the mobile telephony number of the called employee, so as to preserve an adequate level of privacy.

Figure 3C:
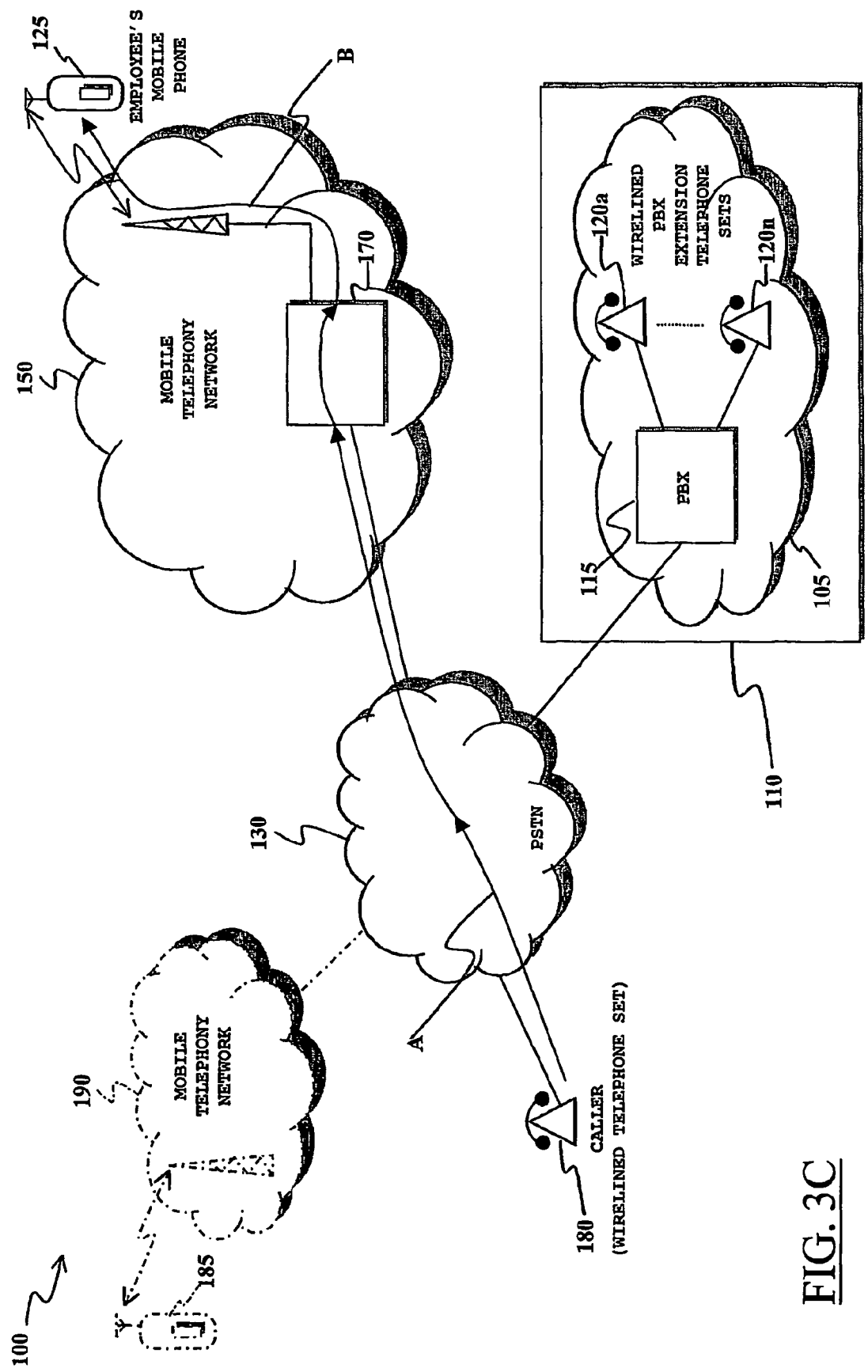

If instead the employer answers the call, the call section B is completed, and it is merged to the incoming call A from the caller (as depicted in FIG. 3C), thereby the caller can at last speak with the desired person (block 237).

It is pointed out that the above described method of forwarding telephone calls to an employee's mobile phone does not cause the business entity 110 to be billed for the call from the PBX network 105 to the mobile phone 125: the telephone call is always billed to the caller, irrespective of whether the call terminates at a wire-lined PBX extension or at the employee's mobile phone. In fact, the telephone call to the PBX virtual mobile telephony number is from the very beginning a call to a mobile telephony number, which is routed from the PSTN 130 to the proper mobile telephony network 150 operator; thus, the caller always knows how much the call he/she is placing will cost, thereby the requirements of billing transparency are satisfied. On the other hand, the business entity 110 is not billed any call, since no call is actually placed from the PBX network 105 to the employee's mobile phone 125: in fact, the mobile telephony network 150 operator drops the call to the PBX network 105, and causes the incoming call A from the caller to be terminated at the mobile phone 125.

In the exemplary embodiment described in the foregoing, the switchboard operator had to manually dial the mobile telephony number of the desired employee, plus the prescribed DTMF feature code. Alternatively, the switchboard operator may interact with the mobile telephony network 145 operator via a data communication network such as the Internet or a GPRS connection, and exploit a Web-based software application for instructing the mobile telephony network operator to try and pass the call A towards the specified mobile telephony number.

According to still another alternative (which however is not incompatible with the switchboard operator-based solution described in the foregoing), the filtering action by the switchboard operator may in some cases be dispensed for, and the call forwarding to the mobile telephony numbers of the employees be similar to what happens when an external caller places a call to a DID extension 120*a*, ..., 120*n*.

To this purpose, a virtual mobile telephony number is assigned to each employee of the business entity 110, or at least to a selected group of employees; in particular, the virtual mobile telephony number associated with a given employee is in one-to-one relationship with the extension number of the employee's wire-lined telephone set 120*a*, ..., 120*n*. Referring to the above example, supposing that the business entity has been assigned a PSTN number range from 012345000 to 012345999, where each PSTN number corresponds to a specific PBX extension, the virtual mobile telephony numbers associated with this PSTN number range are 366012345000 to 366012345999; this means that when a caller wishes to call a specified one of the employees of the business entity 110, whose PBX extension is generically 012345xyz, the caller may place a call to the corresponding virtual mobile telephony number 366012345xyz, instead of dialing the corresponding PBX extension number, exactly as in the above described embodiment the caller was free to dial the PBX PSTN number or the PBX mobile telephony number.

At the mobile telephony network 150 operator, a database (for example, the database 155, or another, specifically designed database) is kept in which each virtual mobile telephony number is associated with a real mobile telephony number of that employee. When a call directed to a virtual mobile telephony number 366012345xyz is received at the MSC 170, the service application logic 175*b* governing the SCP 175*a* may try to contact the associated PBX extension, as in the embodiment previously described. If such an attempt fails, the database 155 is searched and the real mobile telephony number that corresponds to the virtual mobile telephony number 366012345xyz is extracted. A call is then placed to the real mobile telephony number, as in the previously described embodiment, and if the employee decides to answer the call, the call from the caller is successfully terminated at the employee's mobile phone 125. Also in this case, the subject which is billed the call is the caller, irrespective of whether the called employee answer the call at his/her PBX wire-lined extension, or at his/her mobile phone.

It is observed that in this latter scenario, wherein no switchboard operator needs to be involved, and the routing of incoming calls to the mobile phone 125 is automatic, for example after a prescribed number of calls, any auto-responder or messaging box function at the PBX wire-lined extension 120*a* of the desired employee should be switched off.

Preferably, the customer (i.e., the business entity 110) should be allowed to configure its proper profile in the database 155 from its premises, by defining the desired correspondences between the PBX network extensions, the virtual mobile telephony numbers and the real mobile telephony numbers of the employees; this can be done for example via a Web-based client-server application, whereby the desired data can be entered or uploaded into the profile database 155. Additionally, the profile in the database 155 may leave each employee free to choose a desired mode of operation, such as whether an incoming call A to the employee's virtual mobile telephony number is to be terminated only at the corresponding PBX network extension, or rather the call may be forwarded to the mobile telephony number in case of no answer at the PBX extension, or if the attempt of terminating the call at the PBX extension is to be avoided tout court, and the call forwarded immediately to the employee's mobile telephony number. In particular, the employee may be allowed to configure his/her own profile in the profile database 155 through his/her PBX extension telephone 120*a*, ..., 120*n*, or through his/her mobile phone.

Additionally, for each or at least some of the employees, more than one mobile telephony numbers can be associated with the virtual mobile telephony number, thereby if a call forwarded to the first mobile telephony number remains unanswered, subsequent call forwarding attempts are made at the other mobile telephony numbers.

Also, the profile database 155 and the service application logic 175*b* may be adapted to implement the call forwarding based on a working time schedule, so that different mobile telephony numbers are associated to an employee depending on the time of the day.

Additionally, the service application logic may be instructed to inhibit the call forwarding when the employee to be reached at the mobile telephone is abroad, and the mobile telephone is registered with a mobile telephony operator under an international roaming agreement, so as to avoid that the business entity sustains part of the telephone call.

Concerning the numbering scheme, in the foregoing it has been assumed by way of example that the PBX virtual mobile telephony number 145 that the mobile telephony network 150 operator assigns to the PBX network 105 and associates with the PBX PSTN telephone number is made up of two parts: a first part, or prefix, in the example adopted 366, identifying the mobile telephony network 150 operator, and a second part, 012345678, coincident with the PBX PSTN number 135. In the case the business entity 110 has been assigned a range of PSTN number, e.g. from 012345000 to 012345999, the business entity is also assigned a range of virtual mobile telephony numbers from 366012345000 to 366012345999.

A different and possibly more expedient prefix scheme will be now discussed. This alternative prefix scheme is based on the fact that in some countries, for example in Italy, it is mandatory for PSTN telephone numbers to begin with a prescribed digit, namely the 0, that serves as an identifier of a PSTN telephone number, followed by a number of digits variable from one to three which identify the locality of the called number. At the same time, mobile telephony numbers have to start with a different prescribed digit, namely the 3, followed by two digits identifying the mobile telephony operator. For example, the digit sequence 02abcdefg identifies a PSTN number in the district of Milan, while the sequence of digits 366abcdefg identifies (at least initially, as far as number portability aspects are neglected) a mobile telephony number of the mobile telephony operator Telecom Italia Mobile. Exploiting this occurrence, an expedient prefix scheme alternative to the one described in the foregoing can provide for attaching, before a PSTN number such as 02abcdefg, the prefix digit 3: the number will thus become 302abcdefg. Provided that a mobile telephony operator wishing to offer the call forwarding service according to the present invention is assigned the nine mobile telephony operator identifiers from 301 to 309, a very simple prefixing scheme for passing from a PSTN number to a (virtual) mobile telephony number would be achieved.

In conclusion, the present invention has been disclosed and described herein by way of some embodiments, but it clear that those skilled in the art could devise several modifications to the described embodiments, as well as other embodiments of the invention, without however departing from the scope thereof as defined in the appended claims.

In particular, although described making reference to a PBX network, the present invention can as well find application in different contexts, such as in a home context, where no PBX network exists.

It is also observed that in the practical implementation of the present invention, use may be made of ENUM (RFC 2916), a suite of protocols developed by the Internet Engineering Task Force (IETF) that have been designed as a means for assisting in the convergence of the PSTN and the Internet. Without entering into details, which are known per se and can be found, directly or by means of hypertext links, at the Web site www.enum.org, ENUM is the mapping of a complete, international PSTN telephone number to Internet services; ENUM sets forth a rule for transforming every telephone number into an Internet domain name: given a telephone number as input, a Universal Resource Locator (URL) is provided as an output, using a Domain Name System (DNS)-based architecture. In other words, ENUM puts telephone numbers into the DNS.

ENUM has been developed as a solution to the question of how to find services on the Internet using only a telephone number, and how telephones, which have an input mechanism limited to twelve keys on a keypad, can be used to access Internet services.

In the context of the present invention, using ENUM the PBX virtual mobile telephony number 145, or the virtual mobile telephony numbers of the employees, can be transformed into a corresponding domain name, wherein information such as the PBX PSTN telephone number, or the employees' DID extensions together with the employees' real mobile telephony numbers are stored (possibly together with additional information such as electronic mail (e-mail) addresses, fax numbers and the like).

The invention claimed is:

1. A method of forwarding a telephone call from a caller intended to be directed to a first, fixed, telephony number toward a second, mobile, telephony number in order to render an intended responder associated with the second telephony number reachable at a mobile phone instead of a fixed telephone, comprising:

having the caller place a call to a virtual mobile telephony number associated with the first telephony number;

receiving the call at a mobile telephony network switching apparatus;

upon receiving, at the mobile telephony network switching apparatus, the call from the caller to the virtual mobile telephony number, identifying the first telephony number associated with the virtual mobile telephony number, and first routing the call to the first telephony number;

receiving the call at a fixed telephony network switching apparatus associated with the first telephony number;

conditioned by the fact that call forwarding from the first telephony number to the second telephony number is enabled, identifying a feature code associated with the virtual mobile phone number;

extracting the second telephony number from the virtual mobile phone number using the feature code; and routing the call from the fixed telephony network switching apparatus to the mobile telephony network switching apparatus using the extracted second telephony number; and if the responder accepts, terminating the call from the caller at the second telephony number instead of at the first telephony number, so as to establish a direct telephone call between the caller and the responder.

2. The method according to claim 1, further comprising:
having the call forwarding enabled at an apparatus associated with the first telephony number.

3. The method according to claim 2, further comprising:
conditioned to the fact that the call forwarding is not enabled and that the incoming call is answered at the first telephony number, terminating the call thereat and establishing a direct telephone call between the caller and the first telephony number.

4. The method according to claim 3, further comprising:
in case the call is not answered at the first telephony number, determining the second telephony number and enabling said call forwarding.

5. The method according to claim 4, further comprising:
after the enabling of said call forwarding, dropping a call section from the switching apparatus to the first telephony number, while keeping the call from the caller on hold at said switching apparatus.

6. The method according to claim 1, wherein said first telephony number corresponds to a PBX network having a plurality of extensions.

7. The method according to claim 6, wherein said first telephony number includes a number of a PBX network switchboard.

8. The method according to claim 7, comprising receiving the call at the PBX switchboard, forwarding the call to an intended PBX network extension and, in case the call is not answered, providing the second telephony number to a switching apparatus control controlling the switching apparatus.

9. The method according to claim 6, wherein said first telephony number comprises at least one PBX Direct Inward Dial number corresponding to one of the extensions of the PBX network.

10. The method according to claim 6, wherein said virtual mobile telephony number associated with the first telephony number comprises at least one virtual mobile telephony number associated with said one extension of the PBX network.

11. The method according to claim 1, wherein said virtual mobile telephony number associated with the first telephony number is a combination of the first telephony number and an identifying code or a prefix code.

12. A method of operating a switching apparatus of a mobile telephony network in order to forward a telephone call from a caller intended to be directed to a first, fixed, telephony number toward a second, mobile, telephony number so as to render an intended responder associated with the second telephony number reachable at a mobile phone instead of a fixed telephone, comprising:

associating a virtual mobile telephony number with the first telephony number;

receiving a call placed to the virtual mobile telephony number at the mobile telephony network switching apparatus;

upon receiving, at the mobile telephony network switching apparatus, the call from the caller to the virtual mobile telephony number, identifying the first telephony number associated with the virtual mobile telephony number, and first routing the call from the caller to the first telephony number;

receiving the call at a fixed telephony network switching apparatus associated with the first telephony number;

conditioned on the fact that call forwarding from the first telephony number to the second telephony number is enabled, identifying a feature code associated with the virtual mobile phone number;

extracting the second telephony number from the virtual mobile phone number using the feature code; and routing the call from the fixed telephony network switching apparatus to the mobile telephony network switching apparatus using the extracted second telephony number; and provided that the responder accepts, terminating the call from the caller at the second telephony number instead of at the first telephony number, so as to establish a direct telephone call between the caller and the responder.

13. The method according to claim 12, further comprising:
if the call from the caller is answered at the first telephony number, terminating the call thereat so as to establish a direct telephone call between the caller and the first telephony number.

14. The method according to claim 13, further comprising:
receiving information apt to determine said second telephony number from an apparatus associated with said first telephony number, and causing the call from the caller to be routed thereto.

15. The method according to claim 14, further comprising:
after said receiving information apt to determine the second telephony number, dropping a call section from the switching center to the first telephony number, while keeping the call from the caller on hold.

16. In a telephone communications system comprising a fixed telephony network and a mobile telephony network, a system for forwarding a telephone call from a caller intended to be directed to a first, fixed, telephony number toward a second, mobile, telephony number in order to render an intended responder associated with the second telephony number reachable at a mobile phone instead of a fixed telephone, comprising:
a database associating a virtual mobile telephony number with the first telephony number; and
a call transport layer of the mobile telephony network adapted to:
receive a call placed to the virtual mobile telephony number at the call transport layer;
identify the first telephony number associated with the virtual mobile telephony number;
route the call to the first telephony number at the fixed telephony network upon receiving the call at the call transport layer;
in case a call forwarding from the first telephony number to the second telephony number is enabled:
identify a feature code associated with the virtual mobile phone number:
extract the second telephony number from the virtual mobile phone number using the feature code; and
route the call to from the fixed telephone network to the call transport layer using the extracted second telephony number; and
if the responder accepts, terminate the call from the caller at the second telephony number instead of at the first telephony number, so as to establish a direct telephone call between the caller and the responder.

17. The system according to claim 16, wherein said first telephony number is a number of a PBX network having a plurality of extensions.

18. The system according to claim 17, wherein said first telephony number includes a number of a PBX network switchboard.

19. The system according to claim 17, wherein said first telephony number comprises at least one PBX Direct Inward Dial number corresponding to one of the extensions of the PBX network.

20. The system according to claim 17, wherein said virtual mobile telephony number associated with the first mobile telephony number comprises at least one virtual mobile telephony number associated with said one extension of the PBX network.

21. The system according to claim 16, wherein said virtual mobile telephony number associated with the first mobile telephony number is a combination of the first telephony number and an identifying code, particularly a prefix code.

* * * * *

UNITED STATES PATENT AND TRADEMARK OFFICE
CERTIFICATE OF CORRECTION

| | | |
|---|---|---|
| PATENT NO. | : 7,756,514 B2 | |
| APPLICATION NO. | : 10/580047 | |
| DATED | : July 13, 2010 | |
| INVENTOR(S) | : Muratore et al. | |

It is certified that error appears in the above-identified patent and that said Letters Patent is hereby corrected as shown below:

Claim 16, column 16, line 7, "number:" should read --number;--.

Claim 16, column 16, line 10, "call to from the fixed telephone network" should read --call from the fixed telephony network--.

Signed and Sealed this
Fourteenth Day of June, 2011

David J. Kappos
*Director of the United States Patent and Trademark Office*